March 11, 1941.    O. R. SCHURIG    2,234,741
COFFEE MAKER
Original Filed July 31, 1937
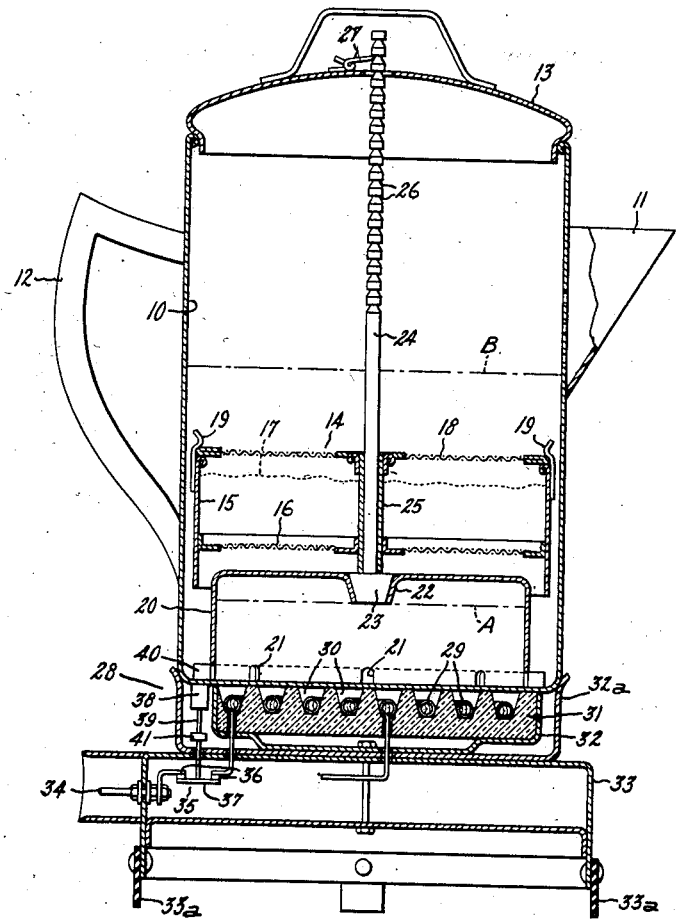
Inventor:
Otto R. Schurig,
by Harry E. Dunham
His Attorney.

Patented Mar. 11, 1941

2,234,741

UNITED STATES PATENT OFFICE 2,234,741

COFFEE MAKER

Otto R. Schurig, Schenectady, N. Y., assignor to General Electric Company, a corporation of New York Original application July 31, 1937, Serial No. 156,736. Divided and this application December 1, 1939, Serial No. 307,071

5 Claims. (Cl. 219—43)

This invention relates to coffee makers, and it has for its object the provision of an improved device of this character.

This invention contemplates an improved coffee maker which heats the water to the proper temperature, and brings it into contact with the coffee grounds under such conditions that a very excellent coffee brew is obtained.

This application is a division of my copending application, Serial No. 156,736, filed July 31, 1937, and assigned to the same assignee as this application.

For a more complete understanding of this invention, reference should be had to the accompanying drawing in which the single figure is a vertical sectional view of a coffee maker embodying this invention.

Referring to the drawing, this invention has been shown in one form as applied to a coffee maker having a water infusing or steeping vessel 10. The vessel 10 is provided with a pouring spout 11 and with a handle 12. A suitable cover 13 is provided for the vessel.

Positioned within the steeping vessel 10 is a coffee basket or container 14. The container 14 as well as the vessel 10 preferably will have a cylindrical form, but this is not necessary as they may have any other suitable shape.

The coffee container 14 has an imperforate side wall 15 and is provided with a screen 16 at the bottom. The screen 16 is secured to the side wall 15. It will be understood that the coffee grounds 17 will be supported upon the screen 16. Preferably, a screen cover 18 will be provided at the top. This screen is secured by means of latches 19.

The coffee container is supported on a bell 20. The bell 20 is provided with apertures 21 that place it in liquid communication with the infusion receptacle. The bell is provided with a central reentrant portion 22 which is normally closed by a plug or stopper 23 to which a rod 24 is attached directed upwardly in the infusion receptacle and through a centrally arranged aperture provided for it in the cover 13, as shown. The coffee container 14 is provided with a centrally arranged tube 25 which is secured to the screen 16 at the center and which extends downwardly through it to engage the upper side of the stopper 23, as shown, and thereby space the container from the bell.

The upper portion of the rod 24 is provided with a series of depressions or steps 26 with which a suitable latch 27 supported on the cover is adapted to cooperate to support the rod 24 in various elevated positions.

The infusing vessel 10 is heated by means of an electrical hot plate 28 comprising a helical resistance conductor 29 wound in grooves 30 provided for it in an electrically insulating brick 31. The brick 31 is housed in a casing 32 which is housed in a larger casing 32a. The two casings 32 and 32a are supported on a base 33 that in turn is mounted on feet 33a.

The stove 28 is provided with twin terminal pins 34 to receive an ordinary supply plug of the usual twin conductor supply cord (not shown); and the energization of the hot plate is controlled by means of a switch 35 having fixed contacts 36 connected in the circuit of the resistance conductor 29 and a movable bridging contact 37 cooperating with the fixed contacts.

The coffee maker thus far described operates as follows: when it is desired to make coffee, a suitable quantity of water will be placed in the infusion vessel 10. Then the bell 20 will be inserted in this vessel with the rod 24 removed so that the bell can vent itself through the central opening through the reentrant portion 22. Preferably, the reentrant portion 22 will be such that a liquid level A will be established in the bell spaced somewhat from the top as shown. The rod 24 will then be inserted so that the stopper 23 is fitted in the seat 22. Then the coffee container 14 with the coffee grounds in it will be inserted in the infusion receptacle over the rod 24, the depending part of the inner tubular member 25 spacing the bottom wall 16 of the coffee container from the top of the bell, as shown.

It is contemplated that the coffee grounds will be immersed initially. In other words, the water level in the infusion vessel should be above the coffee container 14. Thus, the level may be at the line B.

When the water in the bell is heated, it will eventually be forced from the bell by the generation of pressure in the bell, and eventually, the bell will attain sufficient buoyancy to rise in the container to carry the rod 24 and the coffee container 14 upwardly through the water in the coffee maker. As the rod 24 rises, the latch 27 successively engages lower steps 26 until eventually when the bell rises no longer, the latch will hold the rod 24, and the bell and coffee container in their elevated positions. This does not occur however until the bell has risen sufficiently to carry the coffee grounds 17 out of the liquid.

The hot plate switch 35 is controlled by means operated responsively to the rise and fall of the bell 20. For this purpose, a magnet 38 is attached to the switch contact 37. As shown, the contact 37 has an operating rod 39 extending upwardly into the space between the casings 32 and 32a, and the magnet is located in this space and attached to the upper end of the rod. The magnet cooperates with an iron ring 40 around the lower edge of the bell, as shown. When the bell is in its lower positions, the magnet is attracted to the ring to hold the switch closed, but when the bell by moving up in the liquid separates the ring and magnet sufficiently far, the magnetic attraction of the magnet for the ring is not sufficiently great to hold the switch closed, and the switch thereupon falls to its open position. A stop 41 attached to the rod 39 engages the bottom wall of the casing 32a to limit the fall of the contact 37. The ring 40 is broken into segments lying between the openings 21, but a complete ring with openings registering with the openings 21 may be used.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is—

1. A device for infusing coffee and the like comprising an infusion chamber for receiving the infusing liquid, a container for the coffee of said infusion chamber, a bell member in said infusion chamber supporting said container constructed and arranged to move upwardly to carry the container out of said liquid due to the generation of a predetermined vapor pressure under the bell member, means for heating the liquid under said bell member to generate said vapor pressure, and switching means operated by the upward movement of said bell member controlling said heating means to shut off the heat from said chamber.

2. A coffee maker comprising an infusion receptacle, a coffee container in said receptacle, a bell in the bottom of said receptacle having liquid communication with it, electrical heating means under said bottom heating the liquid in said bell to drive it from the bell and thereby give the bell buoyancy to float upwardly in said receptacle, a switch controlling said heating means, a magnet and associated magnetic member controlling the operation of said switch, one connected with said switch and the other with said bell arranged so that when said bell is in the bottom of said receptacle, said switch is closed by the attraction of said magnetic member to said magnet, but when the bell is elevated the magnet is separated from the magnetic member to permit the switch to open.

3. A coffee maker comprising a vessel, a ground coffee container in said vessel, a movable member in the vessel supporting said ground coffee container, means moving said supporting member upwardly within said vessel to remove said ground coffee container from the liquid in the vessel responsively to the generation of vapor in said vessel by the heating of said liquid, means for heating said liquid, and means controlling said heating means operated responsively to the operation of said first-named means in moving said supporting member upwardly.

4. A coffee maker and the like comprising an infusion receptacle, a coffee container within said receptacle, a bell in said receptacle supporting said container, the liquid under the bell being forced out from the bell when the pressure generated under the bell by the heating of the liquid in it attains a predetermined magnitude, the bell eventually rising due to its buoyancy as the water is forced out to carry the coffee container up through and out of contact with said liquid, locking means operating responsively to the movement of said coffee container by said bell to a predetermined elevated position automatically locking said coffee container in said elevated position, electric heating means for heating the liquid in said bell, and switch means operating to deenergize said heating means responsively to the upward movement of said bell.

5. A coffee maker comprising an infusion receptacle, a coffee container in said receptacle, a bell in the bottom of said receptacle having liquid communication with it, electrical heating means under said bottom heating the liquid in said bell to drive it from the bell and thereby give the bell buoyancy to float upwardly in said receptacle, a switch controlling said heating means, a magnet and associated magnetic member controlling the operation of said switch, one connected with said switch and the other in the form of a ring attached to the lower peripheral edge of said bell arranged so that when said bell is in the bottom of said receptacle, said switch is closed by the attraction of said magnetic member to said magnet, but when the bell is elevated the magnet is separated from the magnetic member to permit the switch to open.

OTTO R. SCHURIG.